United States Patent [19]
Tsuda et al.

[11] Patent Number: 5,892,735
[45] Date of Patent: *Apr. 6, 1999

[54] ELECTRONIC APPARATUS AND METHOD FOR MEASURING CUMULATIVE POWER-ON TIME OF AN ELECTRONIC DEVICE

[75] Inventors: Hidekazu Tsuda; Yasumori Mori, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 744,754

[22] Filed: Nov. 6, 1996

[30] Foreign Application Priority Data

Nov. 7, 1995 [JP] Japan .................................. 7-288833

[51] Int. Cl.$^6$ ............................. G04F 8/00; G11C 7/00; G11C 29/00
[52] U.S. Cl. .................... 368/113; 365/189.01; 365/228; 371/21.2
[58] Field of Search .............................. 368/10, 107–113; 364/569; 365/185, 189.07, 189.01, 189.08, 200, 222, 228; 371/21.2

[56] References Cited

U.S. PATENT DOCUMENTS

| | | | |
|---|---|---|---|
| 4,617,639 | 10/1986 | Paine | 364/569 |
| 4,710,888 | 12/1987 | Burke et al. | 364/561 |
| 4,748,594 | 5/1988 | Iida | 365/200 |
| 5,067,111 | 11/1991 | Asano et al. | 365/189.08 |
| 5,608,684 | 3/1997 | Reasoner et al. | 365/228 |

*Primary Examiner*—Vit Miska
*Attorney, Agent, or Firm*—Jay H. Maioli

[57] ABSTRACT

An electronic apparatus for measuring cumulative power-on time of an electronic device is provided with: a capability of measuring the power-on time of the device; a nonvolatile memory having at least three memory areas, each of these areas used to cumulatively store the measured power-on time; and a capability for accurately measuring the cumulative power-on time by comparing the data stored in the memory areas and selecting the information that is most closely repeated in the majority of those memory areas. Also, a method of measuring cumulative power-on time of an electronic device is provided which consists of the steps of: measuring the power-on time of the device; writing the measured power-on time in at least three areas of a nonvolatile memory; and accurately measuring the cumulative power-on time by comparing the data stored in the memory areas and selecting the information that is most closely repeated in the majority of those memory areas.

10 Claims, 3 Drawing Sheets

ELECTRONIC APPARATUS AND METHOD FOR MEASURING CUMULATIVE POWER-ON TIME OF AN ELECTRONIC DEVICE

BACKGROUND OF THE INVENTION

The present invention relates to an electronic device such as a video display device capable of measuring and displaying its cumulative operating time or the time that it has had power applied to it. An accurate measure and display of this power-on time can be invaluable information when servicing or troubleshooting the device. Also, it can assist in forecasting future spare parts requirements by providing information necessary to calculate their mean time between failures.

One way of obtaining this cumulative power-on information for a color video display device using a cathode-ray tube (CRT), for example, is to measure and update this information by writing it in a nonvolatile memory every 30 minutes, and then beginning a new measuring cycle. When needed, the accumulated measured values are read out from the nonvolatile memory and, if desired, used for calculating the life span of the device or for some other related service feature.

When the power-on time is periodically updated, for example every 30 minutes, such update must be written into the nonvolatile memory during a finite period of time. If for a variety of reasons, like a power surge or failure, an electric shock occurs in the nonvolatile memory, in the microcomputer or in the interconnecting signal lines during this finite period of time, erroneous information could be written into the nonvolatile memory resulting in the loss of this valuable cumulative power-on time information.

SUMMARY OF THE INVENTION

It is an object of the present invention to provide an apparatus and method for measuring cumulative power-on time of an electronic device in which the cumulative power-on time can be obtained accurately even when an erroneous value is stored in a nonvolatile memory due to an electric shock, power surge, power failure, or other reasons.

This and other objects, advantages and features of the invention will become apparent to those skilled in the art upon consideration of the following description of the invention.

According to eon aspect of the present invention, an apparatus for measuring cumulative power-on time of an electronic device is provided with: a capability of measuring the power-on time of the device: a nonvolatile memory having at least three memory areas, each of these areas used to cumulatively store the measured power-on time; and a capability for accurately measuring the cumulative power-on time by comparing the data stored in the memory areas and selecting the information that is most closely repeated in the majority of those memory areas.

According to a second aspect of the present invention, a method for measuring a cumulative power-on time of an electronic device is provided which consists of the steps of: measuring the power-on time of the device; writing the measured power-on time in at least three areas of a nonvolatile memory; and accurately measuring the cumulative power-on time by comparing the data stored in the memory areas and selecting the information that is most closely repeated in the majority of those memory areas.

According to a third aspect of the present invention, the measured value of the power-on time is sequentially written in more than three memory areas of the nonvolatile memory. Each time the apparatus is turned on, the values stored in the memory areas are compared with each other and the correct cumulative power-on time is determined by selecting the value that is most closely repeated in the majority of areas. Next, the values stored in the memory areas are made equal to the selected value. Therefore, even when an erroneous value is stored in one memory area because of an electric shock, power surge, power failure, or some other reason, the values stored in the other memory areas are correct and can be used to make all the values stored in all the memory areas correct. Thereby making it possible to obtain an accurate cumulative power-on time when desired.

DETAILED DESCRIPTION OF THE INVENTION

Figure 1:
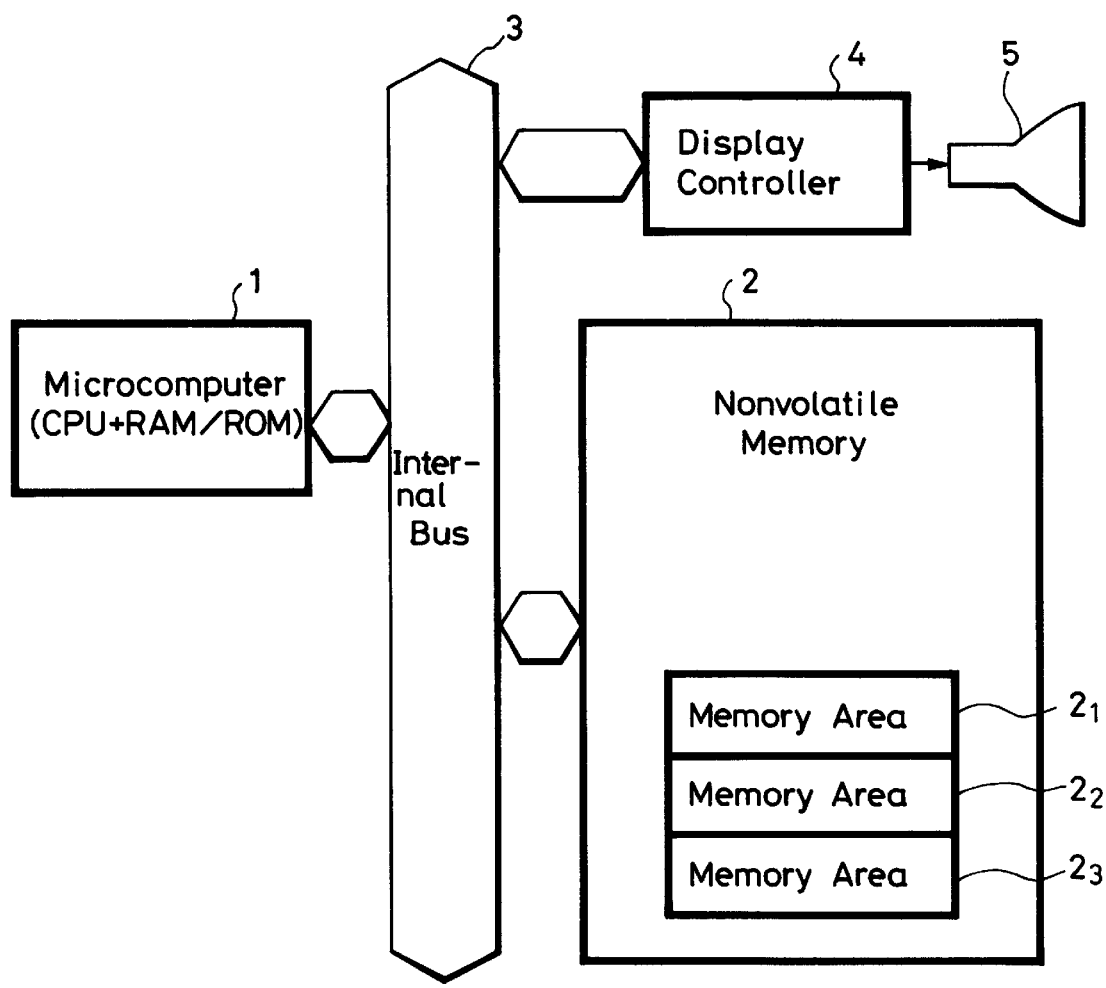
FIG. 1 is a block diagram of a video display device according to the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Turning now to FIG. 1, a microcomputer 1 generates a display signal and a control signal for controlling the power of a monitor. This microcomputer is of the kind generally including a central processing unit and RAM and ROM memories. The display signal and control signal from the microcomputer 1 are supplied through an internal bus 3 and a display controller 4 to the monitor including a color cathode-ray tube (CRT) 5 and a picture or image corresponding to this display signal is displayed on the color CRT 5. These elements then form a so-called personal computer.

In this embodiment, the microcomputer 1 measures or determines the length of time that power is supplied to the color CRT 5 in this video display device. The microcomputer 1 supplies data indicating the measured value of this power-on time through the internal bus 3 to a nonvolatile memory 2.

The microcomputer 1, the nonvolatile memory 2, the internal bus 3, and the display controller 4 need not necessarily be independent devices, and they can be integrated as one or several integrate d circuits.

The nonvolatile memory 2 includes three separate memory areas $2_1$, $2_2$ and $2_3$ into which data indicating the measured values of this power-on time is sequentially written.

Figure 2:
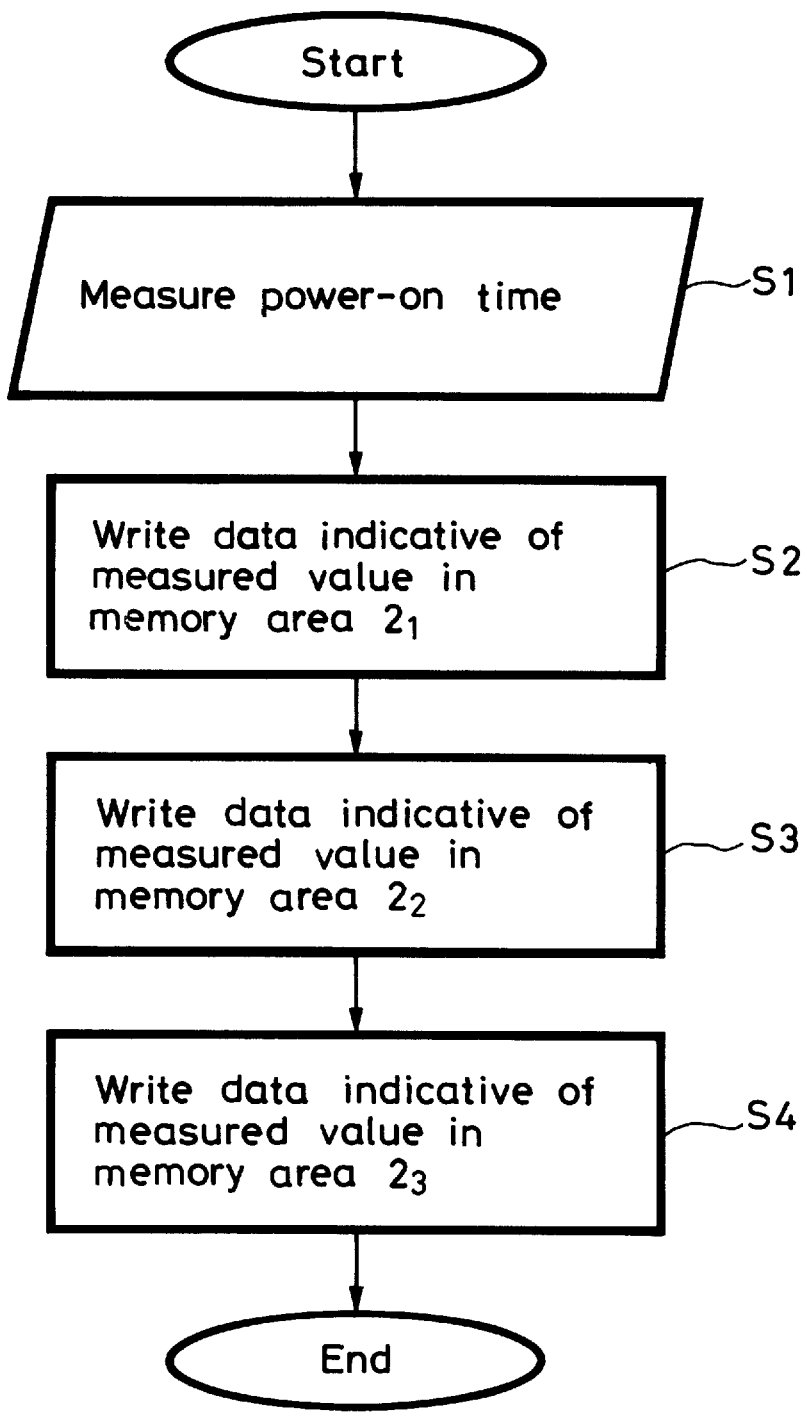
FIG. 2 is a flowchart of the memory write operations.

Now turning to FIG. 2, when the color CRT 5 of the video display device energized, control goes to step S1, where the microcomputer 1 measures the power-on time of the color CRT 5. Then, control goes to step S2, where the microcomputer 1 supplies data indicating the measured value of this power-on time to t he nonvolatile memory 2 and writes the same in the memory area $2_1$.

After the microcomputer 1 has finished writing the data indicating the measured value of this power-on time in the memory area $2_1$ of the nonvolatile memory 2, control goes to step S3, where data indicating the same measured value as that written in the memory area $2_1$ is written in the memory area$_2$ 2. Then, control goes to step S4, where data indicating the same measured value as that written in the memory area $2_2$ is written in the memory area $2_3$.

This operation is carried out periodically, for example every 30 minutes, to update the measured value of the power-on time written in the separate memory areas $2_1$, $2_2$ and $2_3$.

Figure 3:
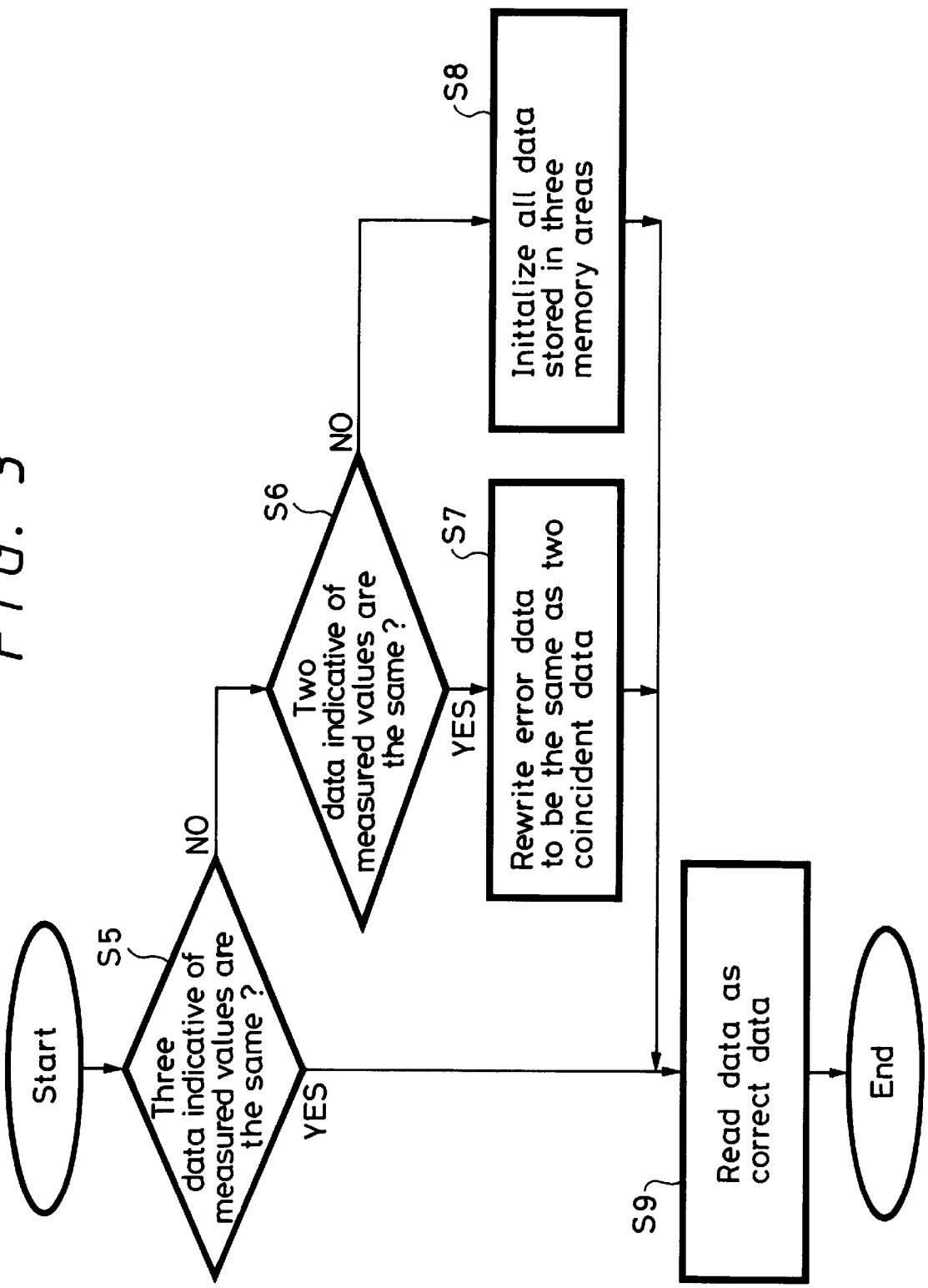
FIG. 3 is a flowchart of the memory read operations and the method for selecting the correct cumulative power-on time.

As shown in FIG. 3, each time the video display device is energized the microcomputer 1 reads out and corrects, if needed, the cumulative power-on time written in the nonvolatile memory areas $2_1$, $2_2$ and $2_3$ in accordance with the above-described procedure.

Specifically, when the video display device is powered, the data stored in the memory areas $2_1$, $2_2$ and $2_3$ is compared with one another at step S5. If the data at the three memory locations is the same, as represented by a YES at step S5, then it is determined that the data is correct, and control goes to step S9, where the data stored in the memory areas $2_1$, $2_2$ and $2_3$ is read and stored as correct data.

If one of the three values stored is different, as represented by a NO at step S5, then control goes to step S6, where it is determined whether the remaining two are the same data. Incidentally, it is frequently observed that the data stored in the memory area $2_2$ is erroneous and the data stored in the memory areas $2_1$ and $2_3$ is correct. It is also frequently observed that erroneous data stored in each memory area of the nonvolatile memory 2 is in error over approximately 30 minutes, so that if a data error is very small, for example, if the error derived from the comparison falls within 0.1%, such data is regarded as the same data, that is, not error data.

If the data stored in two memory areas is the same, as represented by a YES at step S6, then the data which differs from the other two data is regarded as erroneous. Next, control goes to step S7, where the erroneous data is rewritten to make it the same as the other two, and control goes to step S9, where the data is read as correct data.

If the three data values stored in the memory areas $2_1$, $2_2$ and $2_3$ are all different, as represented by a NO at step S6, then it is determined that a continuous write error is occurring. In this case, control goes to step S8, where all data stored in the memory areas $2_1$, $2_2$ and $2_3$ is initialized and control goes to step S9, where the initialized data is read. Thus, when clearly erroneous data is present, the memories are reset or initialized back to their previous valid values and the valid values are read out.

In this embodiment, the measured value of the power-on time is sequentially written in the three memory areas $2_1$, $2_2$ and $2_3$ of the nonvolatile memory 2. Each time the apparatus is turned on, the values stored in the three memory areas $2_1$, $2_2$ and $2_3$ memory areas are compared with each other and the correct cumulative power-on time is determined by selecting the value that is most closely repeated in the majority of areas. Next, the values stored in the three memory areas $2_1$, $2_2$ and $2_3$ are made equal to the selected value. Therefore, even when an erroneous value is stored in one memory area because of an electric shock, power surge, power failure, or other reasons, the values stored in the other two memory areas are correct and can be used to make the values stored in all three memory areas $2_1$, $2_2$ and $2_3$ correct. Thus, making it possible to obtain an accurate cumulative power-on time even in the face of error data.

Therefore, if data representing the cumulative power-on time stored in the memory areas $2_1$, $2_2$ and $2_3$ of the nonvolatile memory 2 is read out in accordance with the flowchart shown in FIG. 3, the correct power-on time of the video display device can be obtained providing this invaluable information for servicing the electronic device.

While the present invention has been described as applied to a video display device as explained above, it is evident that many alternatives will become apparent to those skilled in the art in light of the foregoing description. For example, the present invention can be applied to other electronic devices whose operating time is desired to be known. Also, more than three memories could be used, and also the data values written could be updated more often than the described 30 minutes.

According to the present invention, even when an erroneous value has been stored in a nonvolatile memory due to an electric shock, power surge, power failure, or some other reason, the cumulative power-on time of the electronic device can be obtained accurately.

Thus it is apparent that in accordance with the present invention, an apparatus and method that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An apparatus for measuring a cumulative power-on time of an electronic device comprising:

measuring means for measuring a power-on time of a cathode ray tube display monitor forming said electronic device;

nonvolatile memory means having a plurality of separate memory areas for cumulatively storing in each of said areas the same data representing said power-on time of said cathode ray tube measured by said measuring means, said same data being written sequentially into successive ones of said separate memory areas;

means for connecting said measuring means to said nonvolatile memory means; and determining means for determining the cumulative power-on time of said cathode ray tube each time the cathode ray tube display monitor is turned on by comparing with each other the data stored in said plurality of separate memory areas and selecting a data value corresponding to a majority of substantially equal data among said data stored respectively in said plurality of separate memory areas of said nonvolatile memory means.

2. The apparatus according to claim 1, in which said plurality of memory areas comprise first, second, and third memory areas and said same data representing said power-on time is written into said first memory area, into said second memory area, and into said third memory area sequentially in time.

3. The apparatus according to claim 1, in which said determining means rewrites data corresponding to said majority in one of said plurality of separate memory areas containing data that differs from said majority.

4. The apparatus according to claim 3, in which said determining means initializes each of said plurality of memory areas to a previous respective data value when all data in each respective separate memory area differs from each other.

5. The apparatus according to claim 1, in which said electronic device comprises a display monitor having a cathode-ray tube.

6. A method for measuring a cumulative power-on time of an electronic device comprises the steps of:

measuring a power-on time of a cathode ray tube forming s aid device;

cumulatively storing and sequentially writing the same measured power-on time data into each of a plurality of separate areas of a nonvolatile memory; and determining the cumulative power-on time each time the cathode ray tube is turned on by comparing with each other the data stored in said plurality of separate areas and selecting a data value corresponding to a majority of substantially equal data among said data stored respectively in said plurality of separate memory areas of said nonvolatile memory.

7. The method according to claim 6, in which said plurality of memory areas comprise first, second, and third memory areas and said same data representing said measured Power-on time of said cathode ray tube is written into said first memory area, into said second memory area, and into said third memory area sequentially in time.

8. The method according to claim 6, in which said electronic device comprises a display monitor having a cathode-ray tube.

9. The method according to claim 6, further comprising the step of rewriting data in one of said plurality of memory areas containing data that differs from said majority.

10. The method according to claim 9, further comprising the step of initializing each of said plurality of memory areas to a previous respective valid value when all data in each respective memory area differs from each other.

* * * * *